INVENTORS
ROY D. BROUSSEAU
BY CARL W. KOGSTROM

ATTORNEYS

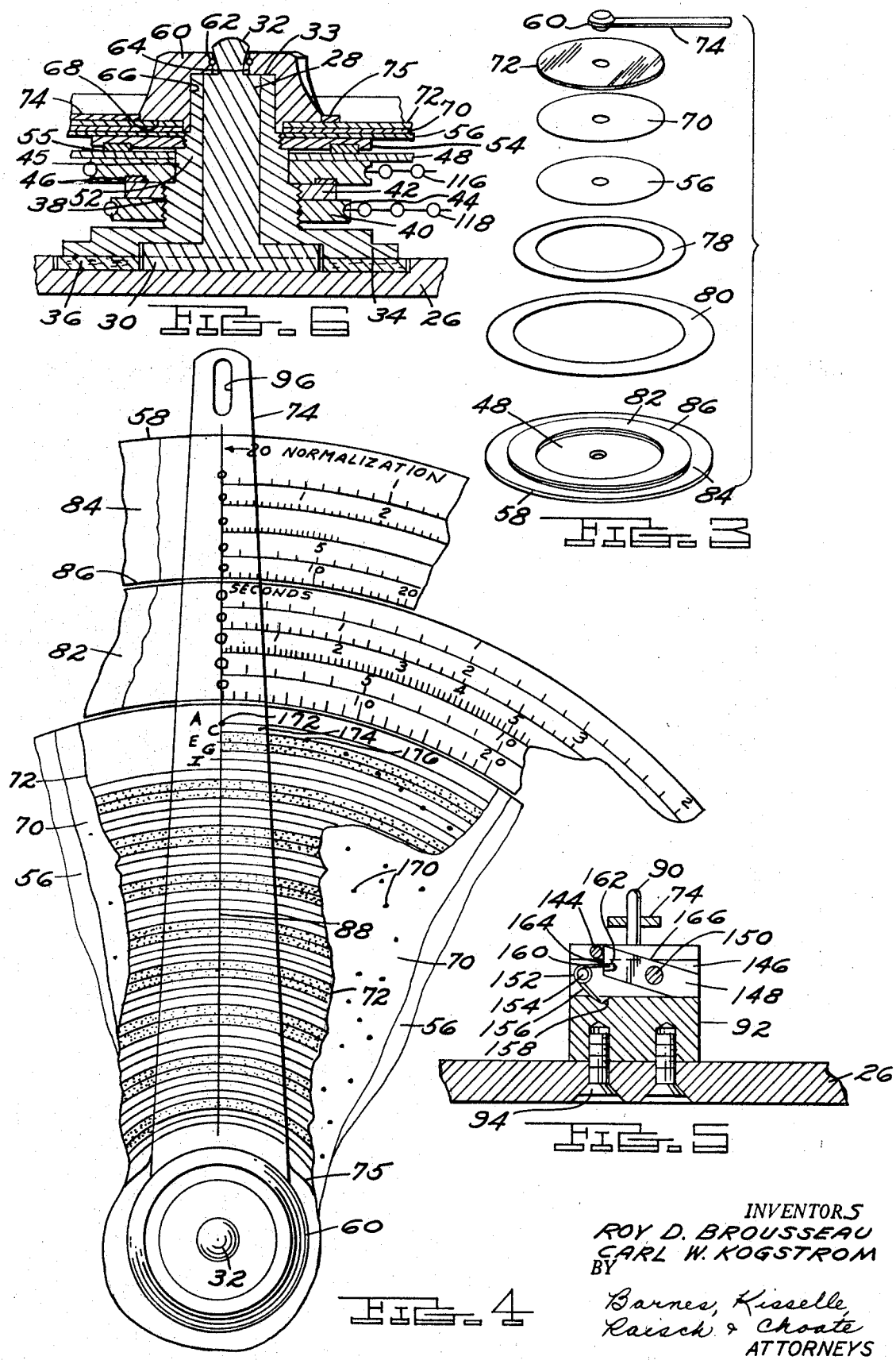

United States Patent Office 3,525,854
Patented Aug. 25, 1970

3,525,854
APPARATUS FOR DECODING RECORDED DATA
Roy D. Brousseau, 11313 Charest, Detroit, Mich. 48212, and Carl W. Kogstrom, Detroit, Mich.; said Kogstrom assignor to said Brousseau
Filed Aug. 8, 1966, Ser. No. 570,918
Int. Cl. G06g 1/08
U.S. Cl. 235—61.6
8 Claims

ABSTRACT OF THE DISCLOSURE

A manually operated chart decoding apparatus comprising a rotary chart table adapted to receive and clamp the recorded disc of chart paper thereon, and a concentric, independently rotatable scale table which carries one or more scale rings, combined with a driving mechanism whereby both turntables are rotatable in one direction to line up a radial index hairline with successive dots so that the time span can be read and noted on a standard time study form. The scale table can be rotated in the opposite direction without moving the chart table to thereby return the scale ring to zero after each reading to thus facilitate direct reading of the normalized time for each element.

This invention relates to apparatus for decoding or converting data recorded on a chart by relative movement between the chart and data recorder and, in particular to a read-off device for rapidly and accurately converting time study data recorded on circular charts in accordance with the method and apparatus disclosed in our copending application Ser. No. 570,918, entitled Method and Apparatus for Making Time Studies, filed concurrently herewith on Aug. 8, 1966, now U.S. Pat. 3,434,149.

The decoder of the present invention as illustrated in the embodiment disclosed subsequently herein is particularly adapted for decoding of a circular chart on which some event or variable is visibly recorded as a function of the relative angular velocity between the chart and the input recording instrument on some predetermined base such that the displacement between markings on the chart represents a permanent record which is convertible by measurement of this displacement distance into a time unit base.

The read-off machine of the present invention is intended to facilitate such conversion and in particular is adapted to be used as an adjunct to the events recorder or time study machine disclosed in our aforesaid copending application. This time study machine is capable of making an accurate, permanent record on a rotating disc of the sequence and duration of time study elements. The disc is made of electro-sensitive paper, of for example 9 inches in diameter, in which dots are formed by condenser discharge through a plurality of styli when the time study observer depresses any one of a corresponding number of key switches individually coded and connected to an associated stylus. The dots appear as a series of angularly spaced visible dots when made by one or more of a plurality of radially spaced styli adapted for example to record information in nine "channels" in a spiral pattern beginning at the outer edge of the chart and spiraling inwardly toward the center of the chart. Each disc can provide up to 30 minutes of recording time, the recording time being variable by selection of turntable speed from one quarter through four revolutions per minute. A chart fully recorded in this manner has a series of dots which appear to be scattered in random fashion over the face of the chart. Accordingly there is a need for a decoder which provides a simple and efficient means of interpreting, or "reading," the data previously recorded in this radially and angularly spaced channel form.

An object of the present invention is to provide an improved data decoding apparatus, herein termed a read-off device or decoder, in the form of a manually operated, portable instrument of simple and inexpensive construction for use in converting data recorded in two dimensional $(x, y)$ spatial relationship on a record into units of time.

Another object of the present invention is to provide a read-off device of the above character which can be operated with a minimum amount of instruction and still maintain maximum accuracy.

Still another object of the present invention is to provide a decoder of the above character which provides a means of rapidly and accurately converting data from discs containing information recorded thereon by the recorder disclosed in the aforesaid copending application selectively or conjointly into seconds, decimal minutes, decimal hours and/or TMU's.

The present invention as illustrated herein by way of a preferred embodiment is in the form of a manually operated chart decoding apparatus comprising a rotary chart table adapted to receive and clamp the recorded disc of chart paper thereon, and a concentric, independently rotatable scale table which carries one or more scale rings, combined with a driving mechanism whereby both turntables are rotatable in one direction to line up a radial index hairline with successive dots so that the time span can be read and noted on a standard time study form.

The decoder apparatus also includes a transparent plastic overlay which, in the case of a nine channel recording, has five corresponding spiral lines that exactly duplicate the spiral rows of dots generated by the two outermost and three alternate intermediate styli when the disc is recorded. The overlay is superimposed on the chart paper, thereby locating the dots on the chart paper in an easily understandable frame of reference closely analogous to a musical score. This overlay is then rotated or indexed until the spirals of the overlay correspond with the appropriate recorded dots that are identified with their respective elemental key. The chart table and scale table are then rotated to align these dots and zero points of the scale rings with a stationary radial hairline of the decoder. Individual recordings are then read by advancing both tables conjointly to align dots successively with the hairline and reading the scale on the calibrated scale rings of the decoder, which will also interpret normalized time for each element. The scale table can be rotated in the opposite direction without moving the chart table to thereby return the scale ring to zero after each reading to thus facilitate direct reading of the normalized time for each element.

Additional objects, features and advantages of the present invention will become apparent from the following detailed description taken in conjunction with the accompanying drawings wherein:

FIG. 3 is an exploded perspective view illustrating the relationship of the radial hairline arm, overlay, chart, scale rings and chart and scale turntables of the read-off apparatus.

FIG. 4 is a fragmentary enlarged plan view of the scale arm, plastic overlay and scale rings of the read-off apparatus.

FIG. 5 is a vertical section taken on the line 5—5 of FIG. 1.

FIG. 6 is an enlarged view of the turntable spindle and drive structure shown in FIG. 2.

Figure 1:
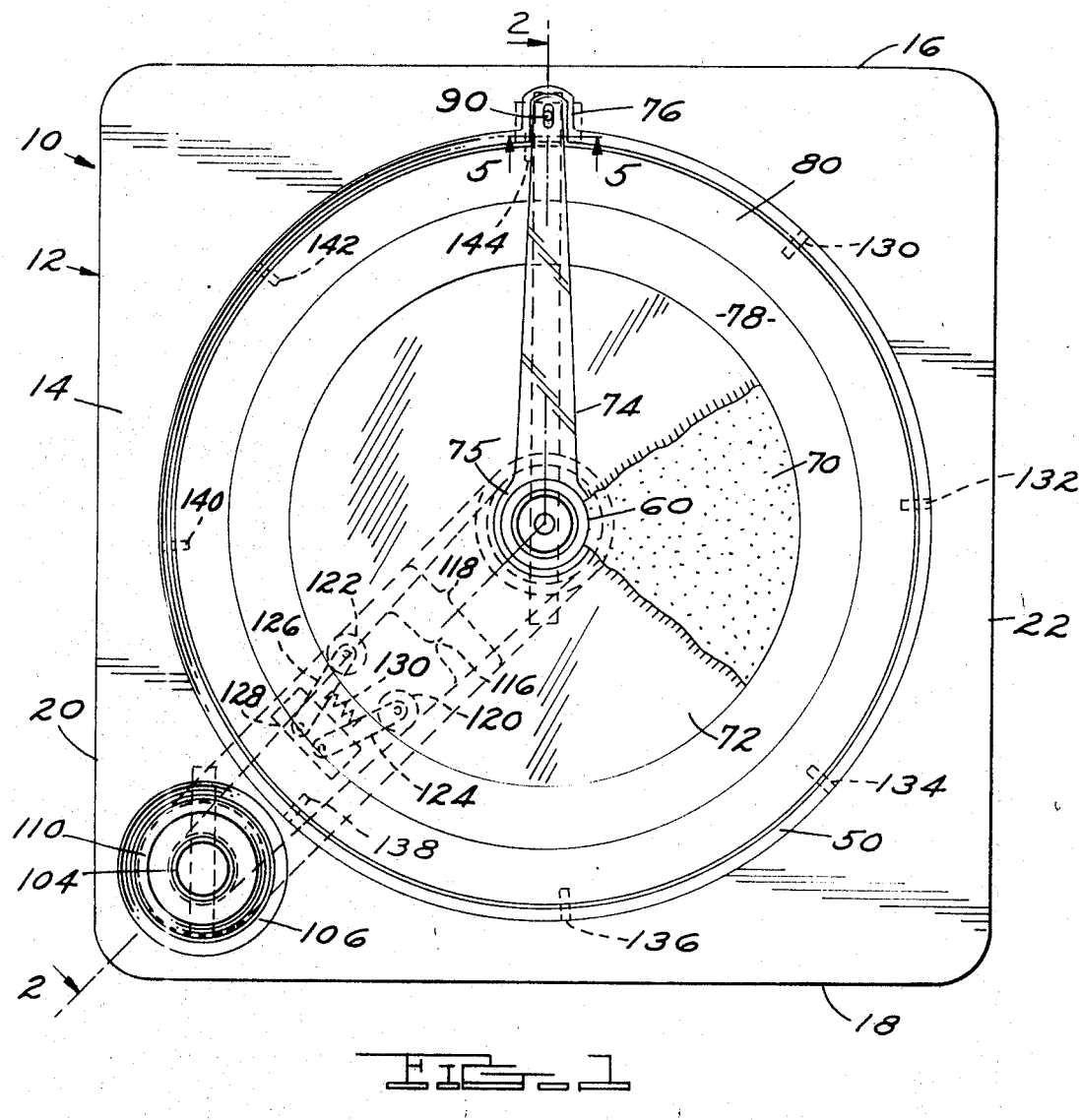
FIG. 1 is a top plan view of a chart read-off apparatus of the invention.
Figure 2:
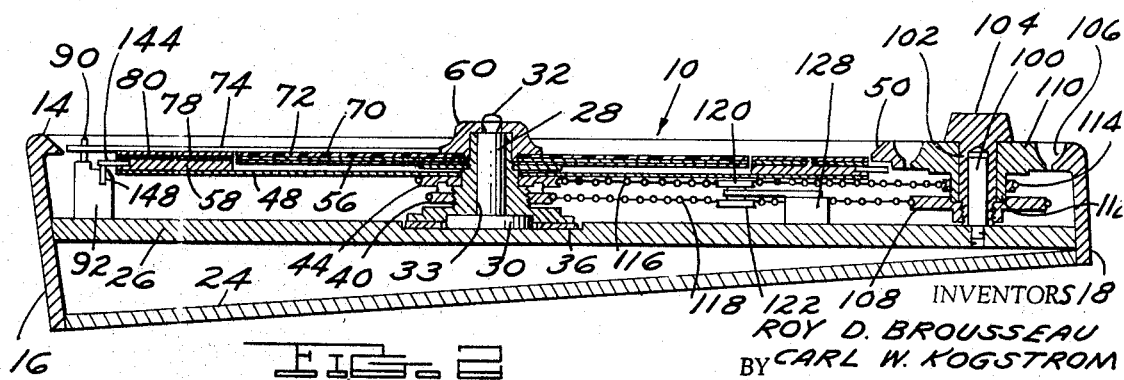
FIG. 2 is a vertical section taken on the line 2—2 of FIG. 1.

Referring to FIGS. 1 and 2, the chart read-off or decoder apparatus 10 of the present invention comprises a generally square case 12, which in the illustrated embodiment is approximately 16″ by 16″, having a flat top wall 14 integrally joined to parallel front and rear walls 16 and 18 and parallel side walls 20 and 22. A bottom wall 24 (FIG. 2) is suitably secured to the lower edges of the walls 16, 18, 20 and 22. Front wall 16 is greater in height than the rear wall 18 so that when the bottom of the case is placed on a level tabletop or desk, top wall 14 slopes downwardly from wall 16 to wall 18 to thereby facilitate use of the decoder by an operator seated facing rear wall 18.

The mechanism of the decoder 10 is mounted on a platform 26 (FIG. 2) suitably secured to walls 16–24 and disposed parallel to top wall 14. Referring to FIGS. 2 and 6, an upright spindle 28 is centrally mounted on platform 26 by a pedestal 30 and has a tapered knob 32 at its upper end. A stepped bearing 33 is rotatably piloted on spindle 28 and has a flange 34 at its lower end adapted to frictionally seat on a friction washer 36 made of felt or the like which encircles pedestal 30 and seats on platform 26. Flange 34 is adapted to compress ring 36 before bearing 33 seats on pedestal 30. Bearing 33 has a threaded portion 38 for threadably receiving a drive sprocket 40 and a nut 42. Another sprocket 44, larger in diameter than sprocket 40, is freely journalled on a reduced diameter portion 45 of bearing 33 and has an annular groove in its under face which receives a friction ring 46 adapted to frictionally engage nut 42. Sprocket 44 has fixed to its upper face for rotation therewith a circular scale table 48 which extends radially outwardly from bearing 33 to a point spaced slightly inwardly of the beveled rim 50 of a circular aperture formed in wall 14 of case 12 concentric with spindle 28. A disc 54 is threaded on a still smaller diameter portion 52 of bearing 33. Disc 54 is grooved on its underside to receive a friction ring 55 which frictionally engages the upper face of table 48. A circular chart table 56 is affixed to the upper face of disc 54 for rotation therewith. Table 56 extends radially outwardly from bearing 33 to a point spaced radially inwardly from the inner periphery of an annular scale ring support 58 (FIG. 2) which is fixed on table 48.

A knob 60 is removably secured on the upper end of spindle 28 by the camming action produced between the tapered sides of knob 32 and a resilient ring 62 carried in a groove formed in the central aperture 64 of knob 60. Knob 60 has a bore 66 which receives the upper end of bearing 33 for rotation relative thereto. Knob 60 is yieldably biased by knob 32 and ring 62 downwardly toward table 56 so that the under face 68 of knob 60 is adapted to clamp a piece of circular chart paper 70 and a transparent circular overlay 72 frictionally together and against table 56 to prevent relative rotation therebetween.

A sight arm 74 is rotatively secured to knob 60 by a circular eye 75 and extends radially outwardly from the knob into a notch 76 (FIG. 1) in rim 50 of wall 14. Arm 74 is spaced slightly above overlay 72 and above two concentric scale rings 78 and 80 (FIGS. 1, 2 and 4) respectively received on inner and outer tracks 82 and 84 formed by an integral dividing rim 86 on the upper surface of annulus 58 (FIGS. 2 and 3). Arm 74 is made of transparent material and has a fine wire or hair embedded therein to provide a hairline 88 (FIG. 4) extending radially of tables 48 and 56. A locater pin 90 (FIGS. 1, 2 and 5) is mounted on a block 92 secured by screws 94 to platform 26 and extends upwardly into a radial slot 96 in the outer end of arm 74 (FIG. 1) to retain the arm against angular movement but permitting removal of the arm and knob 60 when it is desired to change charts or scale rings.

Turntables 48 and 56 may be selectively or conjointly rotated about the axis of spindle 28 in order to angularly index chart 70 relative to scale rings 78 and 80 by a manually actuated drive mechanism as seen in FIGS. 1 and 2. For this purpose a spindle 100 (FIG. 2) is affixed upright to platform 26 radially outwardly of the turntables and in the left rear corner of case 12 (as viewed in FIG. 1). Spindle 100 rotatably receives the shank 102 of a turn knob 104 which extends through a circular aperture in wall 14 defined by the beveled rim 106. The lower end of shank 102 threadably receives the hub of a sprocket 108 which is screwed up against a shoulder of shank 102 to fix sprocket 108 for rotation with knob 104. Another larger diameter knob 110 having a shank 112 is piloted for free rotation on shank 102, knob 110 being axially located between knob 104 and sprocket 108 with turning clearance therebetween. Shank 112 has a sprocket 114 fixed thereon which is drivingly connected with sprocket 49 by an endless bead chain 116 so that rotating knob 110 rotates scale table 48. Another endless bead chain 118 is trained around sprockets 108 and 40 to thereby drivingly connect knob 104 to bearing 33 for rotating turntables 48 and 56 conjointly as explained subsequently. Chains 116 and 118 are respectively tensioned by idlers 120 and 122 (FIGS. 1 and 2) journalled respectively on the free ends of arms 124 and 126. The other ends of arms 124 and 125 are pivoted on a block 128 mounted on platform 26, and a compression coil spring 130 butts at its ends in pockets of the arms to spread them apart and thereby bias the respective idlers into engagement with the associated chains 116 and 118.

Scale turntable 48 is angularly located with reference to the "zero" position of hairline 88 (arm 74 being registered on pin 90) by a series of locater pins 130, 132, 134, 136, 138, 140, 142 and 144 mounted in the outer periphery of annulus 58 and extending radially outwardly therefrom at equally spaced intervals, herein shown by way of example as 45° for an eight pin arrangement (FIG. 1). As best seen in FIGS. 2 and 5, block 92 is provided with an upwardly opening slot 146 which extends tangentially to the path of travel of pins 130, 132 etc. A detent 148 is pivotally mounted on a pin 150 for movement in slot 146 in a plane perpendicular to the pins. A hair pin spring 152 is also mounted in slot 146 on a pin 154, one of its arms 156 engaging a recess 158 in the bottom of slot 146 and the other arm 160 engaging a notch 162 in the adjacent end edge 164 of detent 148 to thereby bias detent 148 to the stop position shown in FIG. 5 wherein edge 164 projects into the path of travel of pins 130–144 and the other end of the detent bottoms in slot 146. Edge 164 extends vertically and is accurately located so that it serves as a stop to prevent clockwise rotation of scale table 48 when any one of the pins abuts thereagainst. The upper longitudinal edge 166 of detent 148 is inclined about 30° to the path of travel of pins 130–144 and hence when any one of the pins strikes edge 166 during counterclockwise rotation of chart table 48 it cams the projecting end of the detent downwardly against the biasing force of spring 152 to thereby permit the pin to pass over the pivoted detent for this direction of rotation of the scale table. As soon as the pin passes edge 164, spring 152 pivots the detent back to the stop position shown in FIG. 5.

To load a piece of recorded chart paper 70 onto the decoder, arm 74 and knob 60 are first removed and the recorded chart paper 70 is then placed onto the upper surface of the chart turntable 56, the center hole of the chart registering with bearing 33 to locate the chart concentrically on the table. Then overlay 72 is placed over chart 70, the center hole of the overlay likewise registering with the bearing 33 to locate the overlay concentrically over the chart paper. Overlay 72 is preferably made of a thin, transparent plastic material of the same diameter as chart paper 70 and has five spiral lines identified A, C, E, G, and I (FIG. 4) scribed on its surface or otherwise provided thereon which exactly duplicate the spiral paths of travel of the corresponding five of the nine styli on the recording head of the aforesaid events recorder during recording of the chart. To facilitate visually identifying the band of nine channels as indicated by the five scribed lines A–I and the four spaces defined between these lines, a spiral portion of the nine channel band in overlay 72 may be dyed yellow or some other contrasting color, without appreciably reducing its transparency, in the space between lines C and G, for example, as illustrated in FIG. 4.

Overlay 72 is then rotated manually relative to the chart paper until the spirals of the overlay correspond with the appropriate dots 170 on the chart. When the scribed line A has its starting point superimposed on the outermost dot present on chart 70, as illustrated in FIG. 4, the overlay is properly registered with the chart. When so positioned overlay 72 converts what appears to be merely a cluster of dots on the chart to a recognizable pattern, in a manner analogous to adding the lines of a musical staff to the notes of a score so that the same are recognizable by a musician. Similarly, a time study man with a minimum of training will be able to recognize the data recorded in dot form on the chart by the relationship of the dots to the lines and spaces of the overlay in terms of the job elements of the time study. Thus, as seen in FIG. 4, the first dot 172 falls under line A and hence represents the start of job element A of the time study. The second dot 174 falls in the space between lines A and C, thereby identifying the same as being in channel B which in turn identifies it as representing job element B of the time study. Thus, since the dots coincide with either the lines or spaces of the overlay, they can be easily related to the numbered key and corresponding job element of the time study. For example, a dot made by pressing any odd-numbered key will be under a line of the overlay, while all even-numbered key dots will appear halfway between the lines.

The same principle applies to the identification of foreign elements or special elements of the time study. Foreign or special elements are identified by depressing more than one key at a time. For example, if during the time study the operator dropped a piece, this foregin element could be identified by pressing down the first and third key of the keyboard of the events recorder at the moment when this element occurs. This would burn two radially aligned dots which would fall under lines A and C of the overlay. The observer would make an appropriate notation on his code sheet denoting that keys 1 and 3 when actuated conjointly denote "operator dropped piece." When the chart is subsequently being read off on decoder 10, the operator would know that two radially aligned dots in these channels indicate that this particular foreign element occurred at this time, and its duration would be recorded in terms of the distance from the two dots burned at the initiation of the foreign elements to the subsequent two dots burned by actuating the same keys at the termination of the foreign element.

After the overlay has thus been aligned and properly registered with the chart, knob 60 is snapped down onto spindle knob 32 to thereby clamp chart 70 and overlay 72 frictionally to one another and to table 56, and then arm 74 is remounted on the decoder by dropping rim 75 onto knob 60 and inserting pin 90 into slot 96 at the outer end of the arm. Scale rings 78 and 80 are next placed on tracks 82 and 84 so as to concentrically encircle overlay 72 in the plane of the chart and overlay. Rings 78 and 80 are divided into units of time, inner ring 78 being shown by way of example as having five radially spaced concentric 360° time scales with the indicia thereof laid out to represent angular distance in terms of units of time on an absolute basis. The scales may be calibrated in seconds, hundredths of a minute, or TMU's (a term of the art meaning "time measurement units" based on decimal portions of an hour), or other suitable scale units. Each scale on ring 78 is calibrated for one of the recording speeds available on the recording study and hence only one of these scales is used for any given chart which has been recorded throughout at a given speed.

Ring 80 has a similar set of radially spaced concentric scales, but these scales are arranged in a sequence of eight different sets with each set extending only 45° and corresponding to the 45° increments as delimited by the eight pins 130–144 on scale table 48. Each of the segment scales of ring 80 is calibrated to provide a particular normalized time for eight pace rating percentages. For example, the scale segment may be respectively calibrated to provide 80%, 85%, 90%, 95%, 105%, 110%, 115% and 120% normalization. Other convenient breakdowns may also be used. Thus ring 78 provides actual time readings while ring 80 enables the reader to obtain normalized time directly from the original recorded chart.

The procedure for interpreting the recorded chart requires that the operator next rotate scale rings 78 and 80 until the zero points of the selected normalization segment and of ring 78 are aligned with hairline 88 and hence with the first dot 172 on the chart. This initial alignment is done by holding table 48 stationary with one of the pins 130–144 abutting against the edge 164 of detent 148 and manually sliding rings 78 and 80 on their respective tracks 82 and 84 until zeroed in.

The operator is then ready to start reading off the time study data recorded on chart 70 and noting the same on a standard time study form. The operator first rotates both turntables 48 and 56 by turning inner knob 104 which, via chain 118 and bearing 33, positively drives table 56, and via nut 42 and nut 54 and the respectively interposed friction washers 55 and 46, frictionally drives table 48, sprocket 44 and chain 116 being thereby back driven so that knob 110 rotates in the same direction as knob 104. Both turntables are thus rotated as a unit counterclockwise as viewed in FIG. 4 until the second dot 174 is brought beneath hairline 88. The operator may then read directly the normalized time interval between the first and second dots on the appropriate scale segment of ring 80 and/or he may read regular or actual time from the appropriate scale on ring 78 merely by sighting along hairline 88. The time span for job element A is then noted in the space provided for this element on the standard time study form.

Then knob 110 is rotated in the opposite direction thereby rotating only turntable 48 clockwise as viewed in FIG. 4, while the turntable 56 remains stationary, until the zero points of scales 78 and 80 are returned into alignment with hairline 88. This is rapidly accomplished since pin 144 will strike detent 148 when table 48 reaches the zero reset position. Then knob 104 is again turned to rotate turntables 48 and 56 conjointly counterclockwise as viewed in FIG. 4 until the next or third dot 176 is registered with hairline 88. The time span between the dots 174 and 176 then is read directly in actual time from the appropriiate scale of ring 78 or in normalized time from the appropriate scale of ring 80. Rings 78 and 80 are then once again reset to zero by turning knob 110, while table 56 and the superimposed chart 70 and overlay 72 meanwhile remain stationary with dot 176 aligned with hairline 88. This procedure is repeated throughout the entire time study, the converted read-off time values being recorded onto a regular time study sheet containing the elemental breakdown of the job which was previously recorded.

If desired, the operator can eliminate the zero reset procedure and record onto the time study sheet using a continuous method of recording the successive time values for each successive dot, but the zero reset feature is preferred since it offers a fast and reliable method of directly reading time intervals and eliminates the need for subtracting one element from another to obtain the time span for each element, thereby tending to reduce calculation errors as well as computation labor. Once the appropriate scale segment of ring 80 has been determined from the rating or performance for the job data recorded, ring 80 is used to give a direct conversion into normalized time for each element, further reducing the computation required in arriving at usable data.

The feature of conjoint rotation of tables 56 and 48 by turning knob 104 in one direction, and counterrotation of only scale table 48 by rotating knob 110 in the opposite direction, is accomplished by a differential friction clutch arrangement between the two turntables. Thus when torque is applied from knob 104 to bearing 33 to rotate table 56 counterclockwise via its positive connection to the bearing, the inertia of table 48 is the only force resisting the turning force applied frictionally via friction rings 55 and 46 to table 48, and this frictional engagement is sufficient to overcome the inertial resistance and thereby rotate table 48 counterclockwise with table 56. However, when counterrotative torque is applied from knob 110 to table 48 via the positive connection through chain 116 and sprocket 44 to thereby rotate table 48 clockwise, the frictional engagement between table 48 and friction rings 46 and 55 is insufficient to overcome the frictional restraining or drag force exerted between flange 34 of bearing 33, friction ring 36 and the stationary platform 26 and hence bearing 33 and hence chart table 56 remain stationary. This difference in frictional engagement between bearing 33 and platform 26 and between bearing 33 and table 48 permits the aforesaid differential action, and also is advantageous in tending to stabilize operation of the tables by reducing override and preventing accidental movement of the tables. The threaded mounting of plate 54 and the threaded mounting of nut 42 permit adjustment of the frictional engagement pressure between bearing 33 and table 48 and also serve as lock nuts for locking sprocket 38 and table 56 to the bearing.

From the foregoing description, it will now be apparent that the decoder or read-off machine of the present invention provides a simple and economical device for enabling quick and accurate conversion of data recorded on circular charts wherein time duration is expressed in terms of angular distance on the rotatively recorded chart paper. In the case of the particular dot recording of a time study, time may be readily taken directly between any two dots of the same channel in the case of separate channel recording, or from one channel to the next in the case of sequential recording. The zero reset feature further enhances the accuracy and time saving of the data conversion procedure, and the normalization scale ring eliminates a further computation step. When it is desired to shift from one normalization to another, this is quickly accomplished by rotating knob 110 to rotate scale table 48 counterclockwise as viewed in FIG. 4 until the selected normalization segment arrives at arm 74. The detent 148 permits free rotation in this direction but provides an accurate positioning stop against rotation in the opposite direction to thereby bring the zero setting of the selected normalization segment into alignment quickly with hairline 88. The provision of a plurality of scales on each ring 78 and 80 correlated with the selected recording speeds adds to the versatility of the decoder apparatus of the present invention and provides a highly compatible adjunct to the time study machine disclosed in our aforesaid copending application.

We claim:

1. Apparatus for decoding recorded data comprising a support, a spindle mounted on said support, a first turntable having a surface adapted to support a circular chart thereon, means mounting said first turntable on said spindle for rotation about the axis of said spindle, a second turntable, means mounting said second turntable on said spindle for rotation about the axis of said first turntable, said second turntable having track means concentrically encircling said first turntable and adapted to support an annular scale thereon, a sight arm mounted on said spindle and extending radially therefrom over said turntables adjacent the respective chart surface and track means thereof to facilitate registry of data recorded on the chart with the annular scale, and drive means operably connected to said tables for rotating said tables conjointly through at least one revolution thereof in one direction and for counterrotating said second table while retaining said first table stationary relative to said support, said drive means comprising first rotator means operably connected to said first turntable for rotating the same, drag means frictionally resisting rotation of said first table and thereby requiring a predetermined torque to be applied to said first rotator means in order to rotate said first table, clutch means frictionally interconnecting said first and second tables and having a torque transfer capability less than that of said drag means, and second rotator means operably connected to said second turntable for imparting said counterrotating motion to said second table.

2. Apparatus for decoding recorded data comprising a support, a spindle mounted on said support, a first turntable having a surface adapted to support a circular chart thereon, means mounting said first turntable on said spindle for rotation about the axis of said spindle, a second turntable, means mounting said second turntable on said spindle for rotation about the axis of said first turntable, said second turntable having track means concentrically encircling said first turntable and adapted to support an annular scale thereon, an arm removably mounted on said spindle and extending radially therefrom over said turntables adjacent the respective chart surface and track means thereof, means for detachably retaining the outer end of said arm fixed relative to said support, said arm being adapted to provide a radial sight line to facilitate registry of data recorded on the chart with the annular scale, and drive means operably connected to said tables for rotating said tables conjointly through at least one revolution thereof in one direction and for counterrotating said second table while retaining said first table stationary relative to said support, said drive means comprising a bearing journalled on said spindle, means positively drivingly connecting said first turntable to said bearing, drag means adapted to frictionally resist rotation of said bearing and clutch means frictionally interconnecting said bearing and said second table and having a torque transfer capability less than that of said drag means.

3. The combination set forth in claim 2 wherein said drive means further comprises a first knob, means rotatably mounting said first knob on said support radially outwardly of said second table, means drivingly connecting said first knob to said bearing, a second knob, means rotatably mounting said second knob radially outwardly of said second table and means drivingly connecting said second knob to said second table.

4. The combination set forth in claim 3 wherein said means rotatably mounting said knobs on said support comprises a second spindle mounted on said support with its axis disposed parallel to the axis of said first spindle, a shank rotatably received on said second spindle and fixedly connected to said first knob, a first sprocket fixed on said shank for rotation therewith, a second shank fixedly connected to said second knob and rotatably received on said first shank intermediate said first knob and first sprocket, a second sprocket fixedly connected to said second shank, a third sprocket fixed to said bearing, a fourth sprocket rotatably mounted on said bearing and first and second endless flexible elements respectively trained at one end thereof around said first and second sprockets and at the other end thereof respectively around said third and fourth sprockets.

5. The combination set forth in claim 2 further including a plurality of locating means projecting from said second table at equally spaced angular intervals around said second table and detent means fixedly connected to said support and adapted to block passage of said locating means in one direction of rotation of said second table and to prevent passage of said locating means upon rotation of said second table in the opposite direction of rotation thereof.

6. Apparatus for decoding recorded data comprising a support, a spindle mounted on said support, a first turntable having a surface adapted to support a circular chart thereon, means mounting said first turntable on said spindle for rotation about the axis of said spindle, a second turntable, means mounting said second turntable on said spindle for rotation about the axis of said first turntable, said second turntable having track means concentrically encircling said first turntable and adapted to support an annular scale thereon, an arm removably mounted on said spindle and extending radially therefrom over said turntables adjacent the respective chart surface and track means thereof, means for detachably retaining the outer end of said arm fixed relative to said support, said arm being adapted to provide a radial sight line to facilitate registry of data recorded on the chart with the annular scale, and a circular transparent overlay having a central aperture adapted to register with said spindle to concentrically locate said overlay in superimposed relation to said chart supporting surface of said first table, said overlay having means forming a band of visible equally radially spaced lines thereon arranged in a spiral beginning adjacent the outer circumference of said overlay and terminating adjacent the center of said overlay.

7. The combination set forth in claim 6 further including clamping means, means removably mounting said clamping means on said spindle and adapted to bias said clamping means toward said first table, said clamping means being adapted to overlie said overlay and a piece of chart paper disposed on said first table, said last-mentioned mounting means cooperating with said clamping means and said first table to frictionally clamp said overlay and the chart paper therebetween for rotation with said first table.

8. Apparatus for decoding recorded data disposed in two dimensional $x$, $y$ spatial relation on a continuous record chart wherein the $x$ component of the data is oriented on the chart in the direction of movement of the chart defined hereinafter and wherein the $y$ component of the data is oriented in a direction transverse to said direction of movement, said apparatus comprising a stationary first support, a second support movably mounted on said first support adapted to receive a chart thereon for movement therewith, means for moving said second support in the direction of $x$ component of the data on the chart, a third support movably mounted on said first support adjacent said second support in the direction of the $y$ component of the data on the chart and adapted to support a data scale thereon for movement therewith, means for moving said third support in the direction of the $x$ component of data on the chart, an orientation arm, means mounting said arm on said first support positioned to overlie said second and third supports in the direction of the $y$ component of the data on the chart and having a sight line to facilitate comparison and registry between data on the chart and scale, said means for moving said second and third supports comprising first drive means for positively moving said second support in both forward and reverse mode in the $x$ component direction, means frictionally coupling said third support to said positive drive means for movement both forwardly and reversely conjointly with said second support when driving force is applied via said positive drive means, second drive means for positively moving said third support in one of the forward and reverse modes, and drag means for maintaining said second support stationary when driving force is applied to said third support via said second drive means.

References Cited

UNITED STATES PATENTS

| | | | |
|---|---|---|---|
| 550,764 | 12/1895 | Rogers | 235—78 |
| 2,118,773 | 5/1938 | Ball | 235—83 |
| 3,002,683 | 10/1961 | Rowland | 235—83 |
| 3,008,791 | 11/1961 | Rosenthal | 346—121 |

MAYNARD R. WILBUR, Primary Examiner

J. M. THESZ, JR., Assistant Examiner

U.S. Cl. X.R.

235—116

PO-1050
(5/69)

UNITED STATES PATENT OFFICE
CERTIFICATE OF CORRECTION

Patent No. 3,525,854        Dated August 25, 1970

Inventor(s) Roy D. Brousseau and Carl W. Kogstrom

It is certified that error appears in the above-identified patent and that said Letters Patent are hereby corrected as shown below:

Column 8, line 73, cancel "prevent" and insert --permit--.

SIGNED AND
SEALED
NOV 24 1970

(SEAL)
Attest:

Edward M. Fletcher, Jr.
Attesting Officer

WILLIAM E. SCHUYLER, JR.
Commissioner of Patents